(12) United States Patent
Kamihara et al.

(10) Patent No.: US 10,343,790 B2
(45) Date of Patent: Jul. 9, 2019

(54) BURST DISC DEVICE AND AIRCRAFT

(71) Applicant: MITSUBISHI AIRCRAFT CORPORATION, Aichi (JP)

(72) Inventors: Nobuyuki Kamihara, Tokyo (JP); Yuichiro Kamino, Tokyo (JP); Mitsuo Naruse, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 382 days.

(21) Appl. No.: 14/966,811

(22) Filed: Dec. 11, 2015

(65) Prior Publication Data

US 2016/0229553 A1 Aug. 11, 2016

(30) Foreign Application Priority Data

Feb. 10, 2015 (JP) .................................. 2015-24047

(51) Int. Cl.
*B64D 45/02* (2006.01)
*B64D 37/32* (2006.01)

(52) U.S. Cl.
CPC ............. *B64D 45/02* (2013.01); *B64D 37/32* (2013.01)

(58) Field of Classification Search
CPC .......... B64D 37/32; B64D 45/02; B64C 3/34; F16K 17/16; F16K 17/14; F16K 17/1606; H05F 3/00; B65D 83/70
See application file for complete search history.

(56) References Cited

U.S. PATENT DOCUMENTS

| 2,544,820 | A | * | 3/1951 | Baker | ................. | B64D 37/005 |
| | | | | | | 137/587 |
| 3,199,812 | A | * | 8/1965 | Spoecker | ............... | B64D 37/32 |
| | | | | | | 244/135 R |
| 4,985,801 | A | * | 1/1991 | Hellard | ................. | B64D 45/02 |
| | | | | | | 174/70 R |

(Continued)

FOREIGN PATENT DOCUMENTS

| GB | 2515278 A | * | 12/2014 | ........... B64D 37/005 |
| JP | 2012-524383 A | | 10/2012 | |

(Continued)

OTHER PUBLICATIONS

Daemar Inc., PTFE Encapsulated O-Rings; archived by Internet Archive on Nov. 7, 2013; https://web.archive.org/web/20131107075733/https://daennar.com/ptfe_encapsulated_o-rings_355.html/; accessed Feb. 7, 2019 (Year: 2013).*

(Continued)

*Primary Examiner* — Brian M O'Hara
*Assistant Examiner* — Alexander V. Giczy
(74) *Attorney, Agent, or Firm* — Pearne & Gordon LLP (57) ABSTRACT

An insulative ring protects a burst disc of an aircraft from the shock of lightning strikes. The burst disc device includes: a burst disc which is installed inside a main wing to prevent over-pressurization of the main wing; a pressure release passage partially constituted by a support tube and is blocked with the burst disc and leads to the outside of the main wing; an insulative ring which is disposed along the inner peripheral edge at a terminal end of the pressure release passage and exposed to the outside of the main wing, and an insulation layer which is disposed between a flange of the support tube and an inner surface of a panel of the main wing.

14 Claims, 9 Drawing Sheets

(56) References Cited

U.S. PATENT DOCUMENTS

| | | | | |
|---|---|---|---|---|
| 5,077,018 A | * | 12/1991 | Grolmes | F16K 17/02 |
| | | | | 422/113 |
| 2008/0295905 A1 | * | 12/2008 | Sandiford | B64D 37/005 |
| | | | | 137/587 |
| 2009/0071676 A1 | * | 3/2009 | Fernandez Vieira | B64D 37/32 |
| | | | | 174/30 |
| 2011/0284694 A1 | * | 11/2011 | Yamaguchi | B64C 3/34 |
| | | | | 244/135 R |
| 2013/0019981 A1 | * | 1/2013 | Yandle, II | B61D 5/06 |
| | | | | 138/42 |
| 2013/0263934 A1 | * | 10/2013 | Hutchings | F16K 17/00 |
| | | | | 137/68.23 |
| 2013/0313273 A1 | * | 11/2013 | Lynas | B64D 37/10 |
| | | | | 220/746 |
| 2015/0122948 A1 | * | 5/2015 | Haskins | B64D 37/04 |
| | | | | 244/135 R |

FOREIGN PATENT DOCUMENTS

| | | | | |
|---|---|---|---|---|
| JP | 2013-541665 A | | 11/2013 | |
| WO | 2010121058 A2 | | 10/2010 | |
| WO | 2012/045028 A1 | | 4/2012 | |
| WO | WO-2014105335 A1 | * | 7/2014 | B64D 37/30 |

OTHER PUBLICATIONS

Sealing Australia, Encapsulated O'rings, 2014; http://www.sealingaustralia.com.au/encapsulated-orings/;accessed Feb. 7, 2019 (Year: 2014).*

Japanese Office Action for Application No. 2015-024047, dated Jan. 8, 2019.

* cited by examiner

BURST DISC DEVICE AND AIRCRAFT

BACKGROUND OF THE INVENTION

Field of the Invention

The present invention relates to a member for protecting a burst disc, which is installed inside a fuel storage device to prevent over pressurization, from lightning strikes.

Description of the Related Art

The main wings of an aircraft are used as fuel tanks, and fuel is stored inside the hollow main wings. An excessive differential pressure can occur between the inside and the outside of the main wings due to changes in temperature, changes in external air pressure, excessive fuel injection, etc. To avoid the resulting damage to the main wings, a part of the skin of the main wings is formed by a burst disc (rupture disc) which ruptures before the skin (National Publication of International Patent Application No. 2013-541665).

During flight and parking, aircrafts encounter lightning. It is necessary to protect the burst disc from the shock of lightning strikes even when lightning strikes near the burst disc.

Therefore, the present invention aims to provide a member which protects a burst disc from the shock of lightning strikes.

SUMMARY OF THE INVENTION

A burst disc device of an aircraft of the present invention includes: a burst disc which is installed inside a main wing of an aircraft to prevent over pressurization of the main wing; a pressure release passage which is blocked with the burst disc and leads to the outside of the main wing; and an insulative member which is disposed along the inner peripheral edge at a terminal end of the pressure release passage and exposed to the outside of the main wing.

According to the present invention, since the insulative member is disposed along the inner peripheral edge at the terminal end of the pressure release passage leading to the burst disc, lightning is unlikely to strike the terminal end of the pressure release passage. If lightning strikes an outer shell (panel), which is a conductor located around the terminal end of the pressure release passage, and the current of the lightning is diffused along the conductor, the shock waves of the lightning do not directly enter inside the pressure release passage, so that no high pressure exceeding a set pressure affects the burst disc. Therefore, the burst disc can be protected from the shock waves of the lightning strike.

Even if, despite the low probability, lightning strikes the terminal end of the pressure release passage through the insulative member, the insulative member is lying in the discharge gap of the lightning and a creeping discharge occurs along the surface of the insulative member, so that the energy of the shock waves associated with the lightning strike dissipates to the surrounding conductor.

In this case, again, since the shock waves of the lightning do not directly enter inside the pressure release passage, the burst disc can be protected from the shock waves of the lightning strike.

It is preferable that the insulative member in the present invention covers a predetermined area of at least one of the surface of a member located around the terminal end of the pressure release passage and the inner periphery of the pressure release passage.

Here, the insulative member covers a conductor, located around the terminal end of the pressure release passage or on the inner periphery of the pressure release passage, from lightning. It is not required that the conductor to be covered and the insulative member are in contact with each other.

As the insulative member, a molding formed of an insulative resin material or fiber-reinforced resin can be used. If a sealant is interposed between the molding and the conductor, the sealant can be included in the insulative member.

It is preferable that the thickness of the insulative member is set appropriately so as to avoid insulation breakdown.

It is preferable that the insulative member in the present invention is protruding toward the radially inside relative to the inner peripheral edge at the terminal end.

A burst disc device of an aircraft of the present invention includes: a burst disc which is installed inside a main wing of an aircraft to prevent over pressurization of the main wing; a pressure release passage which is blocked with the burst disc and leads to the outside of the main wing; and an insulative member which is disposed along the inner peripheral edge at the terminal end of the pressure release passage and provided with a conductive layer on its surface located on the outside of the main wing, wherein the conductive layer has conductivity and is grounded.

According to the present invention, electrical charges building up on the insulative member due to friction with air or raindrops during flight can be transferred and diffused through the conductive layer to a grounding member. Thus, it is possible to prevent electrostatic discharges by the electrical charges building up on the insulative member.

A burst disc device of an aircraft of the present invention includes: a burst disc which is installed inside a main wing of an aircraft to prevent over pressurization of the main wing; and a pressure release passage which is blocked with the burst disc and leads to the outside of the main wing, wherein the pressure release passage is preferably a labyrinth path having one or more partitions intersecting with the hole axis of the pressure release passage.

According to the present invention, since the shock waves of lightning are damped while traveling through the labyrinth path, it is possible to prevent a pressure exceeding a set pressure from acting on the burst disc.

An aircraft of the present invention includes the above-described burst disc device.

The present invention is a member for protecting a burst disc, which is installed inside a main wing of an aircraft to prevent over pressurization of the main wing, from lightning strikes, wherein the member is disposed along the inner peripheral edge at a terminal end of a pressure release passage which is blocked with the burst disc and leads to the outside of the main wing; exposed to the outside of the main wing; and has insulation properties.

A burst disc device of the present invention includes: a burst disc which is installed inside a device for storing fuel to prevent over pressurization of the device; a pressure release passage which is blocked with the burst disc and leads to the outside of the main wing; and an insulative member which is disposed along the inner peripheral edge at a terminal end of the pressure release passage and exposed to the outside of the device.

According to the present invention, it is possible to protect the burst disc from the shock of lightning strikes.

DETAILED DESCRIPTION OF THE PREFERRED EMBODIMENTS

In the following, embodiments of the present invention will be described with reference to the accompanying drawings.

First Embodiment

Figure 1A:
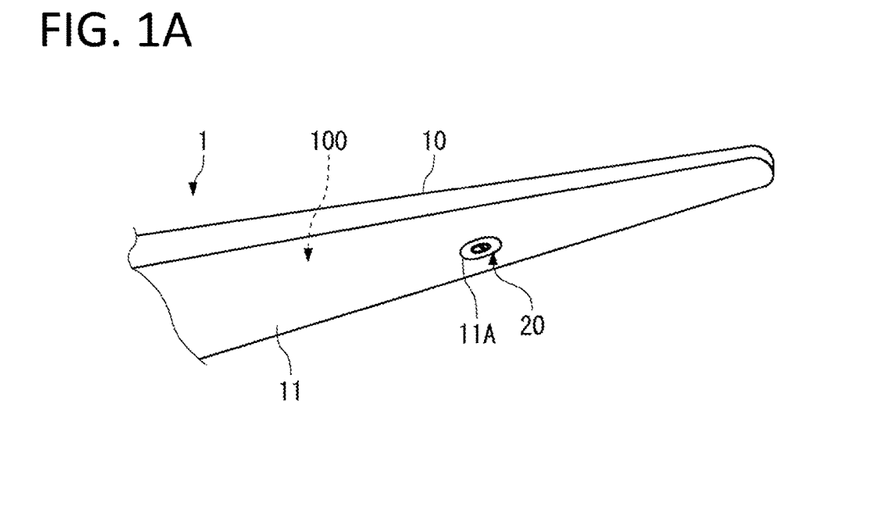
FIGS. 1A and 1B are views showing the external appearance of a burst disc device installed inside a main wing of an aircraft according to a first embodiment of the present invention.

An aircraft 1 of this embodiment shown in FIG. 1A includes a main wing 10 as a fuel tank.

The main wing 10 is a box structure including skins, ribs, and spars, and fuel is stored inside the main wing 10.

The inside of the main wing 10 is divided into a plurality of compartments including a single or a plurality of fuel chambers 100 in which fuel is stored. The main wing 10 is equipped inside with a ventilation system (not shown) which ventilates the compartments with external air. The ventilation system achieves a balance between pressures on the inside and the outside of the main wing 10.

As a part of a lower skin 11 of the main wing 10, there is a panel 11A where a burst disc device 20 which prevents over pressurization of the main wing 10 is installed. The position of the panel 11A shown is one example.

As with the skin 11, the panel 11A is formed of an aluminum alloy, a fiber-reinforced resin containing carbon fibers, or the like. The surface of the panel 11A is formed to be flush with the surface of the skin 11.

On the back side of the panel 11A, a space for installation of the burst disc device 20 is provided. No fuel is stored in this space.

Figure 1B:
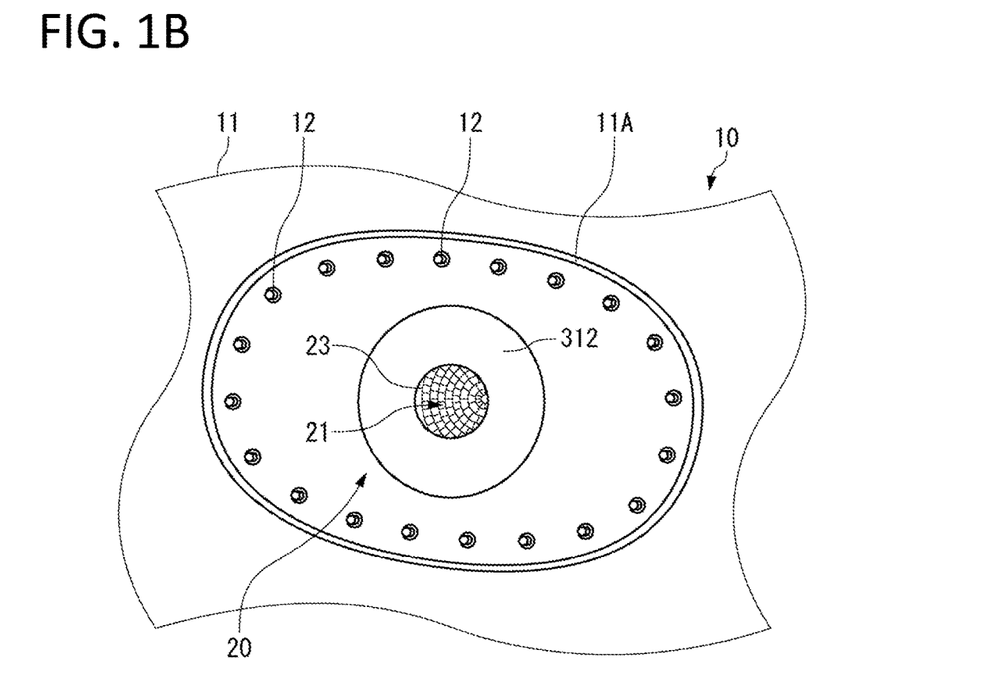

As shown in FIG. 1B, the panel 11A is removably provided on the surrounding skin 11 with a plurality of fasteners 12 which are disposed on the outer periphery of the panel 11A.

Figure 2:
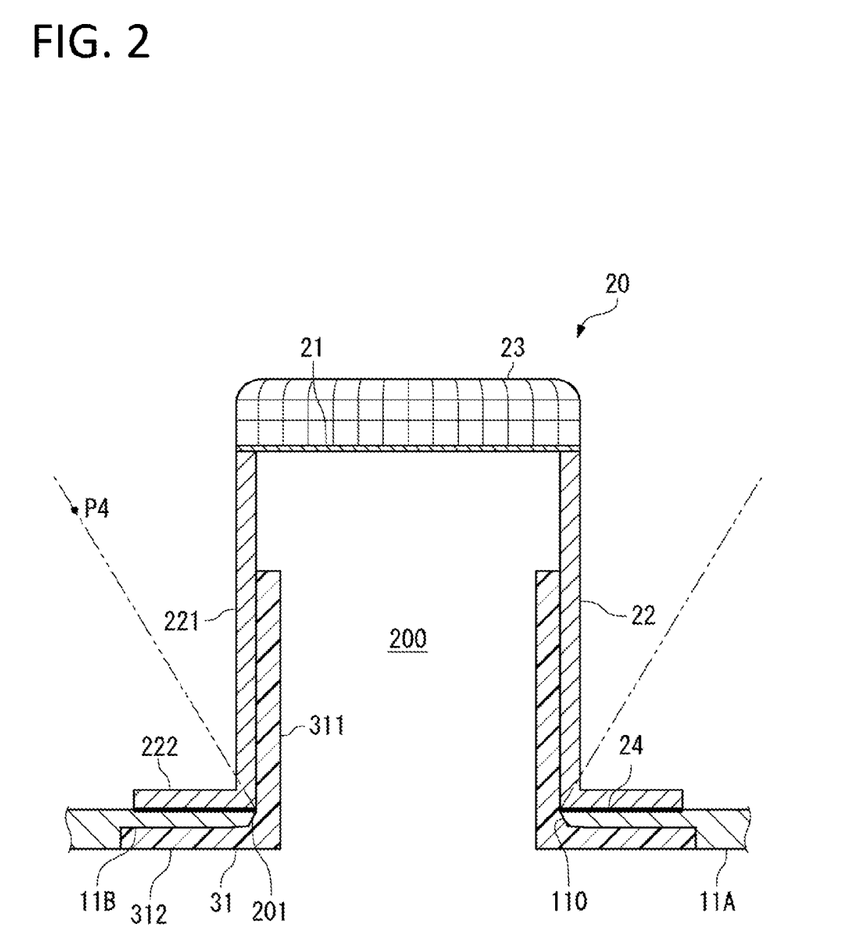
FIG. 2 is a cross-sectional view showing the burst disc device according to the first embodiment.

As shown in FIG. 2, the burst disc device 20 including a burst disc 21 is provided in the panel 11A.

A panel opening 110 penetrating the panel 11A in the thickness direction is formed in a central part of the panel 11A.

The inside of the main wing 10 (fuel chamber 100) and the outside of the main wing 10 communicate with each other through the panel opening 110.

The burst disc device 20 includes: the burst disc 21 disposed above the panel 11A substantially horizontally at a position corresponding to the panel opening 110; a support tube 22 supporting the burst disc 21 on the panel 11A; a mesh screen 23 surrounding the burst disc 21; and an insulative member 31 used for protecting the burst disc 21 from the shock of lightning strikes.

The burst disc 21 is formed of a material, such as carbon or metal, into a circular shape. The burst disc 21 is supported at the upper end of the support tube 22. The burst disc 21 breaks when a predetermined differential pressure (set pressure) between the front and back sides acts thereon.

The planar center of the burst disc 21 and the planar center of the panel opening 110 substantially coincide with each other.

The support tube 22 has a cylindrical tube part 221 and a flange 222 formed at the lower end of the tube part 221. The support tube 22 is formed of a metal material such as an aluminum alloy.

The flange 222 of the support tube 22 is disposed on the back side of the panel 11A along the peripheral edge of the panel opening 110, and is fastened through an insulation layer 24 onto the panel 11A with fasteners (not shown). Thus, the panel opening 110 and the inside of the support tube 22 become continuous with each other.

The screen 23 is formed in a circular shape so as to cover the surface of the burst disc 21 on the inside of the aircraft. The screen 23 receives scattered fragments of the burst disc 21.

The burst disc 21, the support tube 22, and the screen 23 are assembled integrally.

The panel opening 110 of the panel 11A and the inside of the support tube 22 continuous with the panel opening 110 function as a pressure release passage 200 which opens when a high internal pressure is applied to the main wing 10. Fuel gas or liquid fuel inside the fuel chamber 100 can be discharged through the pressure release passage 200 to the outside of the aircraft.

This pressure release passage 200 is blocked with the burst disc 21 which is disposed as a part having a lower strength than the skin 11 enclosing the fuel chamber 100, and opens as the burst disc 21 breaks under the set pressure due to an increase in internal pressure of the main wing 10.

To prevent over pressurization of the main wing 10, the pressure release passage 200 and the burst disc 21 constitute a safety mechanism which is activated when failure occurs in the ventilation system and the internal pressure of the main wing 10 increases.

In this embodiment, the peripheral edge (inner peripheral edge) of the panel opening 110 corresponds to a terminal end 201 of the pressure release passage 200, and the panel 11A corresponds to the member located around the terminal end 201.

The insulative member 31 protects the burst disc 21 from the shock of lightning 9.

The insulative member 31 integrally includes a cylindrical tube part 311 disposed on the inside of the support tube 22, and an annular flange 312 formed at the lower end of the tube part 311. The entire insulative member 31 is formed of an insulation material.

An insulative resin material or a fiber-reinforced resin containing insulative fibers (e.g., glass fibers) as reinforcing fibers can be used as the material of the insulative member 31.

The flange 312 is disposed in a recess 11B of the panel 11A formed around the panel opening 110. The surface of the flange 312 and the surface of the panel 11A are disposed so as to be flush with each other.

The insulative member 31 is disposed concentrically with the panel opening 110 and the support tube 22, and is assembled integrally with the panel 11A and the support tube 22 with fasteners (not shown) which penetrate the flange 312.

The flange 312 of the insulative member 31 covers a predetermined area of the surface of the panel 11A, from the peripheral edge of the panel opening 110 which is the terminal end 201 of the pressure release passage 200 to a position on the outer peripheral side of the peripheral edge. The flange 312 is exposed to the outside of the main wing 10 (FIG. 1B).

In addition, the tube part 311 of the insulative member 31 rising from the flange 312 covers a predetermined area of the inner periphery of the support tube 22 (FIG. 2). The height of the tube part 311 is larger than the radial dimension of the flange 312.

Figure 3A:
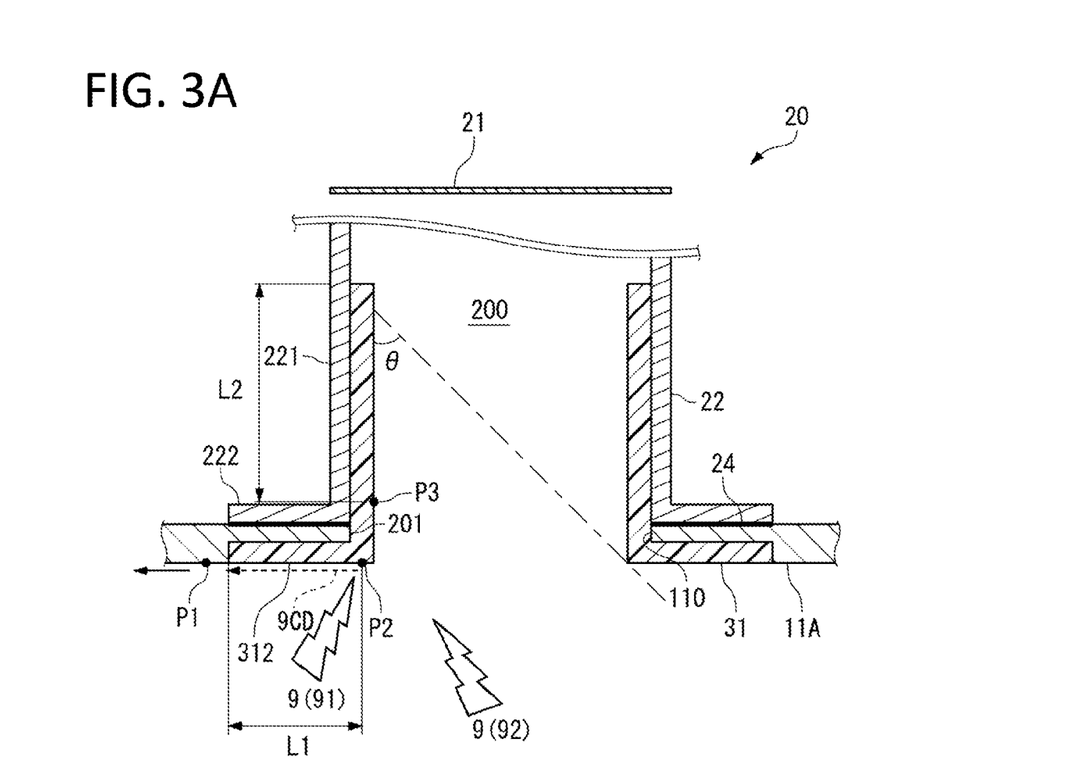
FIG. 3A is a view illustrating the workings of an insulative member.

As shown in FIG. 3A, relative to the lightning 9, the burst disc 21 is located at a position set back from the surface of the panel 11A which is a conductor. Since the lightning 9 usually discharges to a near conductor so as to discharge under conditions which minimize the energy released, the lightning 9 is unlikely to strike the burst disc 21 itself.

A case of concern is where the lightning 9 strikes the terminal end 201 of the pressure release passage 200 leading to the burst disc 21.

The insulative member 31 of this embodiment covers a predetermined area including the peripheral edge of the panel opening 110 in order to suppress lightning strikes at the peripheral edge of the panel opening 110 which constitutes the terminal end 201 of the pressure release passage 200. The lightning 9 is more likely to strike the panel 11A, which is a conductor, than the insulative member 31, and the lightning 9 is unlikely to strike the insulative member 31.

In most cases, therefore, the lightning 9 reaches (strikes) around the insulative member 31 (at a position P1), and the current of the lightning 9 flows along the surface of the panel 11A (solid arrow) and is diffused in in-plane directions of the skin 11. In this case, the striking point of the lightning 9 is at some distance from the terminal end 201 of the pressure release passage 200, which is an inlet from the viewpoint of the lightning 9, and the strong shock waves associated with the lightning strike do not directly enter inside the pressure release passage 200, so that no high pressure exceeding the set pressure acts on the burst disc 21.

Suppose that, despite the low probability, the lightning 9 heads for the predetermined area of the conductor (the panel 11A and the support tube 22) covered with the insulative member 31.

In this case, target points to be reached by the lightning 9 are represented by a position P2 on the flange 312 covering the surface of the panel 11A and a position P3 on the inner peripheral surface of the tube part 311 covering the inner peripheral surface of the support tube 22.

Figure 3B:
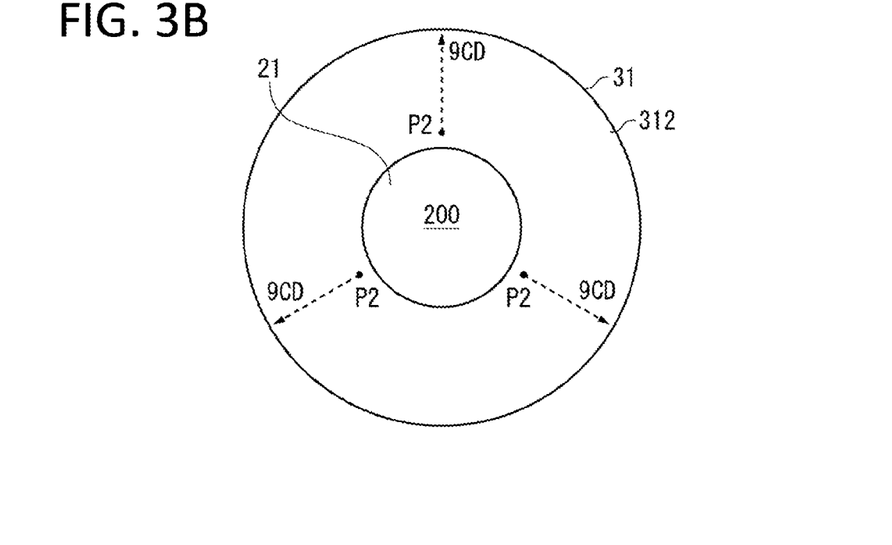
FIG. 3B is a plan view showing the burst disc device from the outside of the main wing.

Here, since the flange 312 of the insulative member 31 is lying in a discharge gap G between the lightning 9 (91) and the surface of the panel 11A, the lightning 91 strikes the surface (at the position P2) of the flange 312 and causes a creeping discharge 9CD along the flange 312 (see the dashed arrow). FIG. 3B shows a state in which the leading end of lightning (not shown) heading for a central part in the plane of the pressure release passage 200 branches off and strikes at a plurality of positions (positions P2) in the peripheral direction of the flange 312, causing the creeping discharges 9CD.

The creeping discharge 9CD assumes a finely-branched shape (not shown in detail), and traverses the flange 312 outward in the width direction toward the conductive panel 11A located around the flange 312. Then, the creeping discharge is diffused via the conductor from the panel 11A to the surrounding skin 11. A distance L1 from the position P2 to the conductor (panel 11A) located around the flange 312 corresponds to the creeping discharge distance.

As described above, when the lightning 9 striking the insulative member 31 causes the creeping discharge 9CD along the insulative member 31, the energy of the shock waves associated with the lightning strike dissipates to the panel 11A and the skin 11 according to the flow of the current.

Therefore, no high pressure exceeding the set pressure and leading to breakage acts on the burst disc 21, so that the burst disc 21 is kept from breaking.

Unlike the surfaces of the panel 11A and the flange 312 which are 180 degrees open to the lightning 9, the inner peripheral surface of the support tube 22 which is the inner periphery of the pressure release passage 200 has a small angle at which the lightning 9 (92) can enter, and therefore has a low probability of being struck by lightning. The deeper the position is inside the pressure release passage 200 (on the side of the burst disc 21), the smaller an angle θ at which lightning striking at that position can enter, hence the lower probability of lightning strikes.

On this basis, in this embodiment, the predetermined area of the inner periphery of the support tube 22 is covered with the insulative member 31 (its tube part 311), and the height of the tube part 311 is set to be larger than the radial dimension of the flange 312. Thus, a larger creeping discharge distance L2, from the position P3 at which lightning strikes the inner peripheral surface of the tube part 311 to the conductor (support tube 22) located above the tube part 311, than the above-mentioned creeping discharge distance L1 is secured (L1<L2) to thereby avoid the occurrence of the creeping discharge 9CD on the inner periphery of the pressure release passage 200 leading to the burst disc 21.

As with the lightning 9, the creeping discharge 9CD discharges under conditions which minimize the energy released. Therefore, even if, despite the low probability, the lightning 92 reaches the position P3 on the inner peripheral surface of the tube part 311, the creeping discharge 9CD occurs along the surface of the flange 312 in which the creeping discharge distance is smaller.

Other than increasing the height of the tube part 311 as in this embodiment, for example, gradually increasing the diameter of the support tube 22 toward the upper end as indicated by the two-dot chain lines in FIG. 2 can also increase the creeping discharge distance from the position of a lightning strike to the target point of a creeping discharge (e.g., the position P4). Thus, it is possible to efficiently secure the creeping discharge distance effective for avoiding the occurrence of creeping discharges on the inner periphery of the pressure release passage 200 inside the thin main wing 10.

According to this embodiment, since the insulative member 31 is disposed at the terminal end 201 of the pressure release passage 200 leading to the burst disc 21 so as to be exposed to the outside of the main wing 10, lightning strikes at the terminal end 201 of the pressure release passage 200 are suppressed. Even if, despite the low probability, lightning strikes the insulative member 31, the lightning causes the creeping discharge 9CD along the flange 312 and the energy of the shock waves associated with the lightning strike dissipates to the panel 11A and the skin 11, so that the burst disc 21 can be protected from the shock waves of the lightning strike.

It is therefore possible to maintain the function of the burst disc 21 which prevents over pressurization of the main wing 10, as well as to improve the safety of the aircraft without causing an accident in which, for example, fuel leaks from a broken portion of the burst disc 21 and catches fire.

Figure 4:
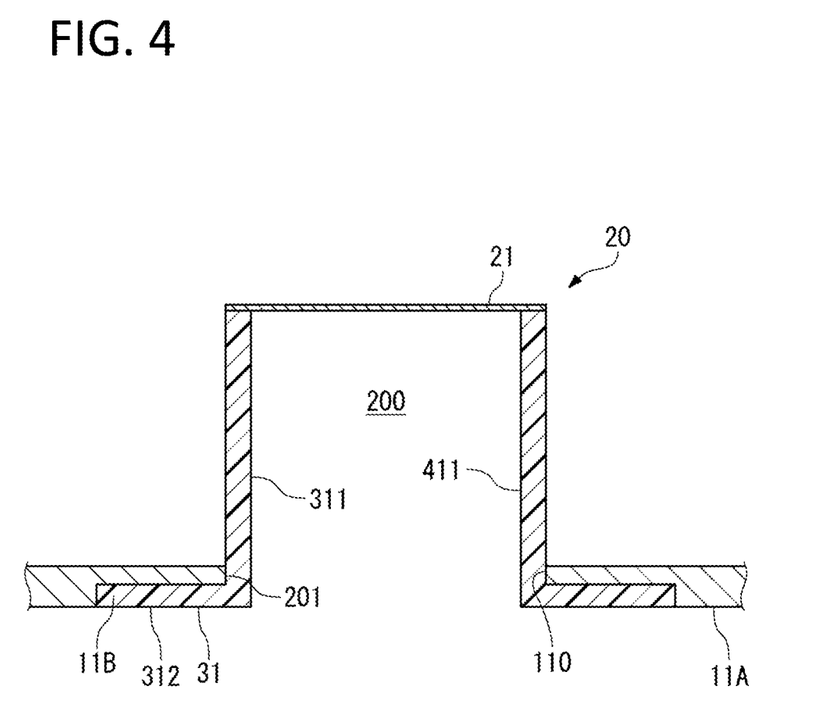
FIG. 4 is a view showing a modified example of the first embodiment.

A modified example of the first embodiment is shown in FIG. 4. The burst disc device 20 shown in this example does not include the support tube 22 which supports the burst disc 21 in the first embodiment (FIG. 2). The screen 23 is not shown. As in this example, the burst disc 21 can be supported at the upper end of the insulative member 31.

Second Embodiment

Figure 5:
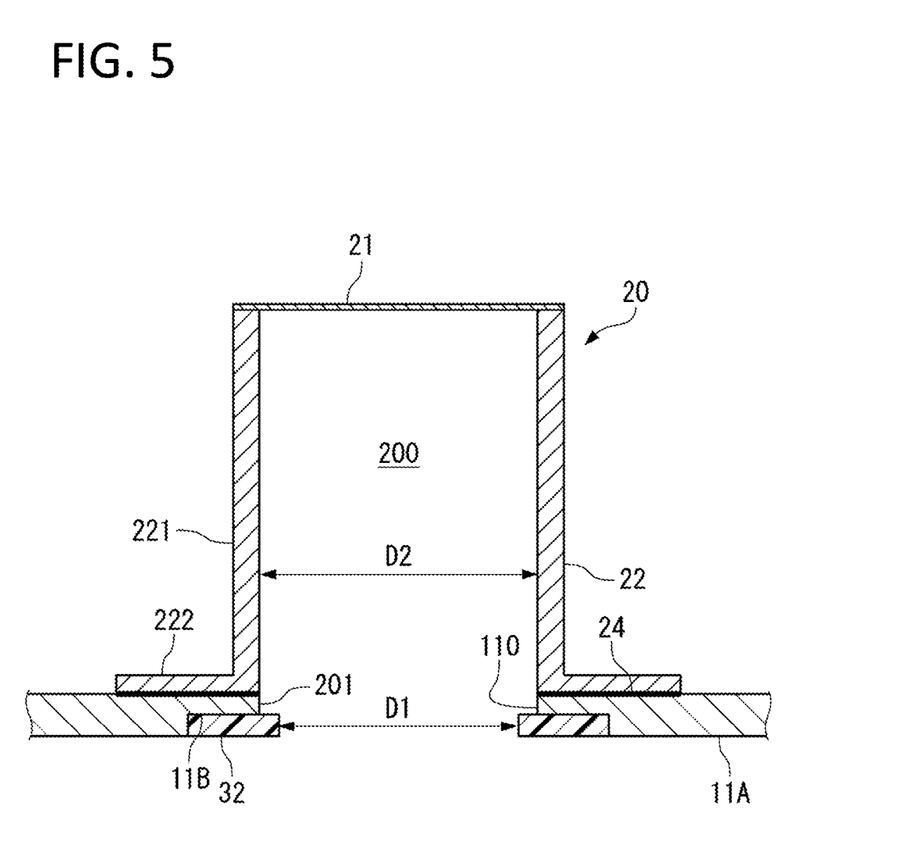
FIG. 5 is a cross-sectional view showing a burst disc device according to a second embodiment.

Next, a second embodiment of the present invention will be described with reference to FIG. 5.

For the subsequent embodiments, differences from the first embodiment will be mainly described. The same components as in the first embodiment are given the same reference signs.

The burst disc device 20 of the second embodiment includes the burst disc 21, the support tube 22, the screen (not shown) (see reference sign 23 in FIG. 2), and an insulative ring cover 32 which substitutes for the insulative member 31 of the first embodiment (FIG. 2).

The ring cover 32 is formed of an insulative material, such as a resin material or a fiber-reinforced resin containing glass fibers, into an annular shape, and is installed in the recess 11B of the panel 11A. The surface of the ring cover 32 and the surface of the panel 11A are disposed so as to be flush with each other.

The ring cover 32 covers a predetermined area of the surface of the panel 11A, from the peripheral edge of the panel opening 110 which is the terminal end 201 of the pressure release passage 200 to a position on the outer peripheral side of the peripheral edge, and is exposed to the outside of the main wing 10.

An inner diameter D1 of the ring cover 32 of this embodiment is set to be smaller than an inner diameter D2 of the panel opening 110, and the ring cover 32 is protruding toward the radially inside relative to the peripheral edge of the panel opening 110.

As in the first embodiment using the insulative member 31, the ring cover 32 of this embodiment covers the predetermined area including the peripheral edge of the panel opening 110 constituting the terminal end 201 of the pressure release passage 200. Accordingly, lightning is more likely to strike the panel 11A, which is a conductor, than the ring cover 32 which is an insulator, and lightning is unlikely to strike the ring cover 32.

When lightning strikes around the ring cover 32, the current of the lightning flows along the surface of the panel 11A and diffuses in in-plane directions of the skin 11.

Even if, despite the low probability, lightning strikes the surface of the ring cover 32, the lightning causes the creeping discharge 9CD along the surface of the ring cover 32 toward the panel 11A around the ring cover 32, and the lightning current is diffused via the conductor from the panel 11A to the surrounding skin 11.

Therefore, in neither of the cases where lightning strikes the panel 11A located around the ring cover 32 and where the lightning strikes the ring cover 32, do the strong shock waves associated with the lighting strike directly enter inside the pressure release passage 200, so that the burst disc 21 is kept from breaking.

As described above, the probability that the lightning 9 strikes the inner peripheral side of the pressure release passage 200 is low.

Moreover, in this embodiment, the ring cover 32 is protruding toward the inside relative to the peripheral edge of the panel opening 110, and the position P3 on the inner peripheral surface of the support tube 22 is located in the shadow of the ring cover 32 from the viewpoint of the lightning. Therefore, lightning strikes at the position P3 can be avoided.

The second embodiment having been described above can also reduce the probability of breakage of the burst disc 21 due to the shock waves of lightning strikes and improve the safety of the aircraft.

Figure 6:
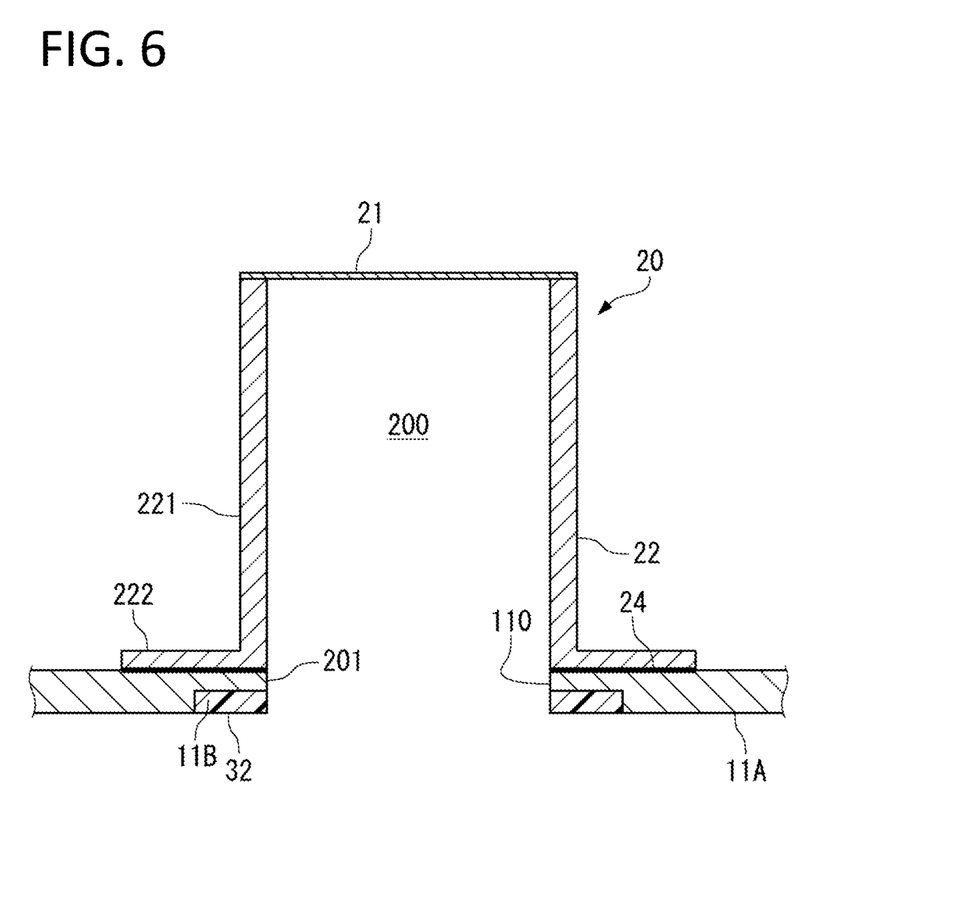
FIG. 6 is a view showing an example in which an insulative ring cover is not protruding toward the inside from the peripheral edge of a panel opening.

As shown in FIG. 6, the inner diameter D1 of the ring cover 32 can also be specified to be equal to the inner diameter D2 of the panel opening 110. In this case, too, the ring cover 32 can suppress lightning strikes at the terminal end 201 of the pressure release passage 200 and, even if lightning strikes the terminal end 201, can reduce the probability of breakage of the burst disc 21 on the basis of the effect of diffusing the lightning current to the surrounding conductor.

Figure 7A:
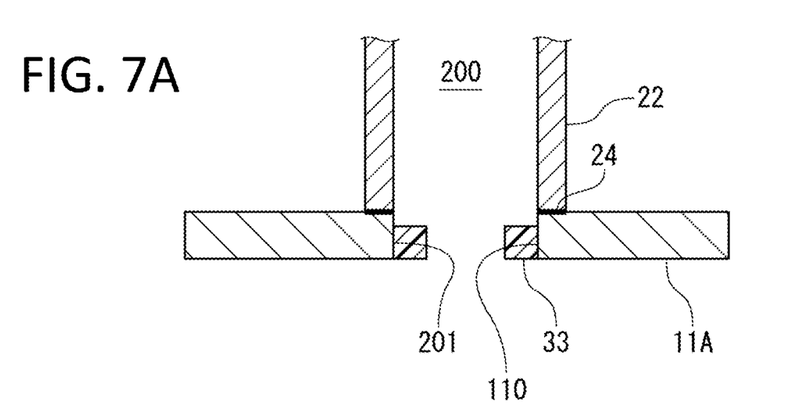
FIGS. 7A to 7C are views showing various forms of an insulative cover.
Figure 7B:
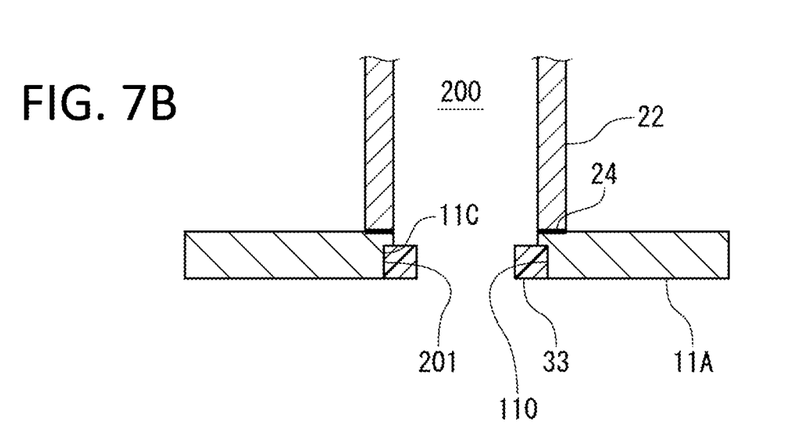
Figure 7C:
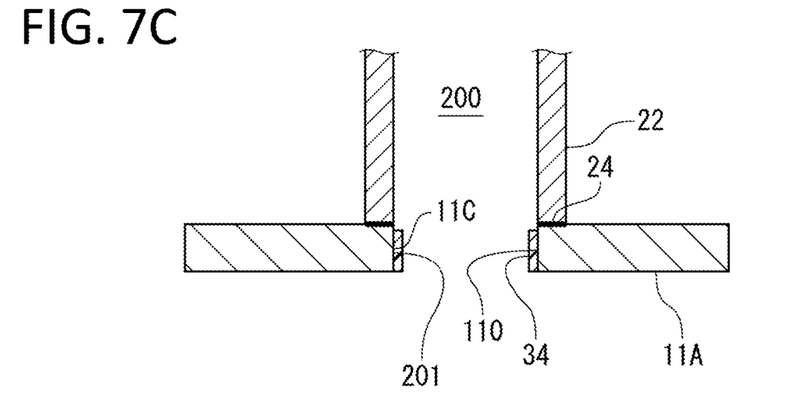

Other than the insulative member 31 (first embodiment) and the insulative ring cover 32 (second embodiment) described above, for example, the insulative members respectively shown in FIGS. 7A to 7C can also be adopted.

An insulative member 33 shown in FIG. 7A is an annular member which is disposed further on the inside than the peripheral edge of the panel opening 110 and exposed to the outside of the main wing 10.

As shown in FIG. 7B, the insulative member 33 may be disposed on a step 11C formed in the panel 11A.

As shown in FIG. 7C, it is also possible to form an insulative film 34 which covers the inside of the peripheral edge of the panel opening 110.

With any of the configurations shown in FIGS. 7A to 7C, lightning strikes at the terminal end 201 of the pressure release passage 200 are suppressed by the insulative members (33, 34) disposed along the inner peripheral edge (peripheral edge of the panel opening 110) at the terminal end 201 of the pressure release passage 200, so that the probability of breakage of the burst disc 21 can be reduced.

Third Embodiment

Figure 8:
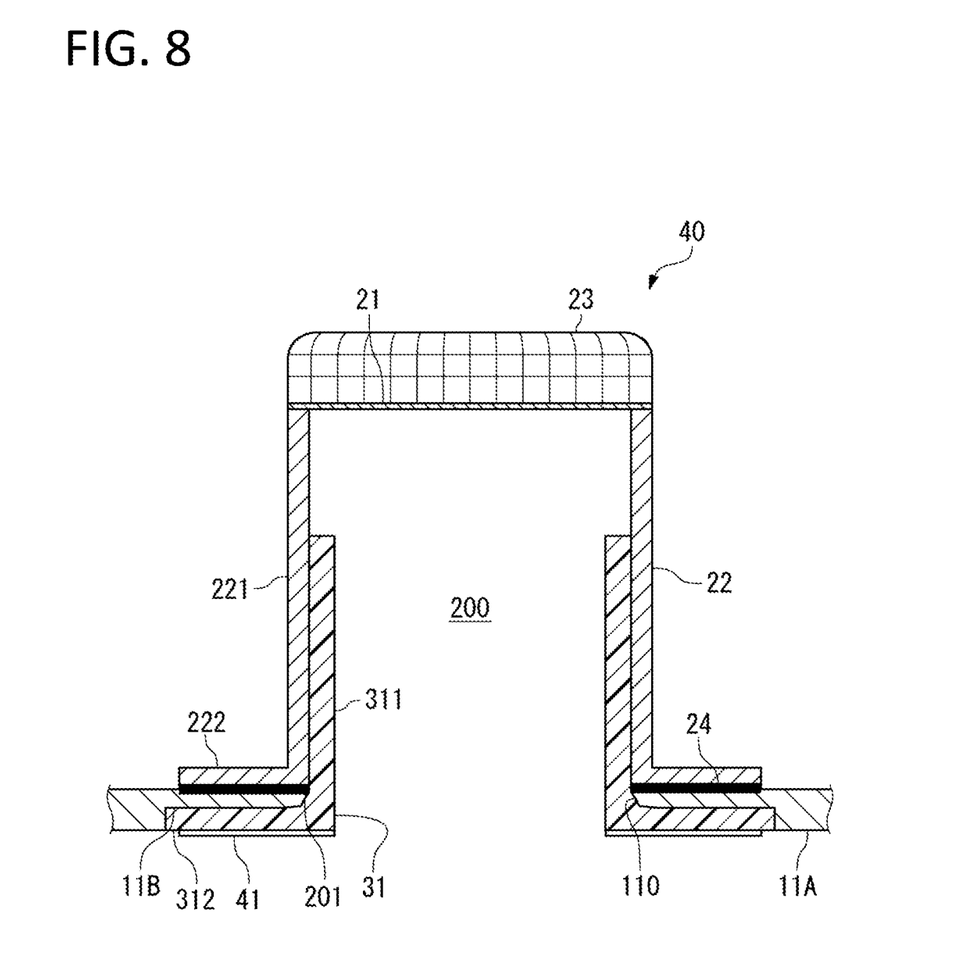
FIG. 8 is a schematic view showing a burst disc device according to a third embodiment.

Next, a third embodiment of the present invention will be described with reference to FIG. 8.

Except that a conductive layer 41 having conductivity is formed on the surface of the flange 312 of the insulative member 31, a burst disc device 40 of the third embodiment is the same as the burst disc device 20 of the first embodiment (FIG. 2).

The conductive layer 41 is a coating film, a vapor deposition film, or the like containing particles of metal, carbon, etc., and has conductivity. The volume resistivity of the conductive layer 41 is, for example, several tens of kΩ·cm to several MΩ·cm.

The conductive layer 41 does not attract the lightning 9 due to the above surface resistivity.

The conductive layer 41 covers the surface of the insulative member 31 which is exposed to the outside of the main wing 10 (the surface of the flange 312), and is grounded to a structural member, such as the skin 11, through a conductor such as the panel 11A or the fastener.

Therefore, electrical charges building up on the insulative member 31 due to friction with air or raindrops during flight can be transferred and diffused through the conductive layer 41 to the airframe. Thus, it is possible to prevent electrostatic discharges by electrical charges building up on the insulative member 31.

According to the conductive layer 41 of this embodiment, the insulative member 31 does not get damaged by electrostatic discharges, and the function of the insulative member 31 protecting the burst disc 21 from lightning strikes can be ensured.

It is possible to provide the conductive layer 41 with an appropriate electrical resistance (volume resistivity or surface resistivity) such that static electricity can be released without attracting the lightning 9.

Fourth Embodiment

Next, a fourth embodiment of the present invention will be described with reference to FIGS. 9A and 9B.

Figure 9A:
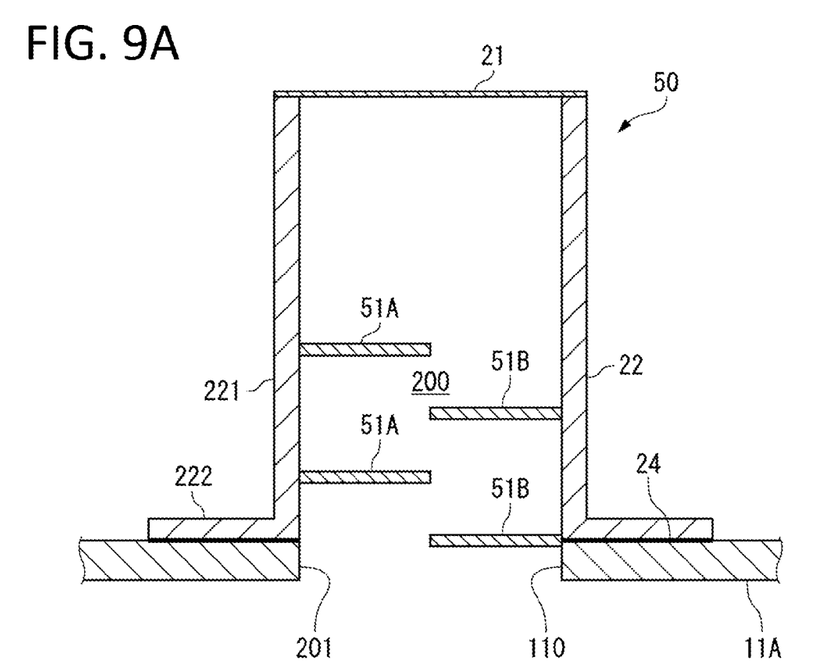
FIGS. 9A and 9B are schematic views showing a burst disc device according to a fourth embodiment.

As shown in FIG. 9A, a burst disc device 50 of the fourth embodiment includes the burst disc 21 and the support tube 22 supporting the burst disc 21.

The support tube 22 constitutes the pressure release passage 200 which is blocked with the burst disc 21 and leads to the outside of the main wing 10.

The inside of the support tube 22 is a labyrinth path having partitions 51A, 51B which are orthogonal to the axis of the support tube 22.

Figure 9B:
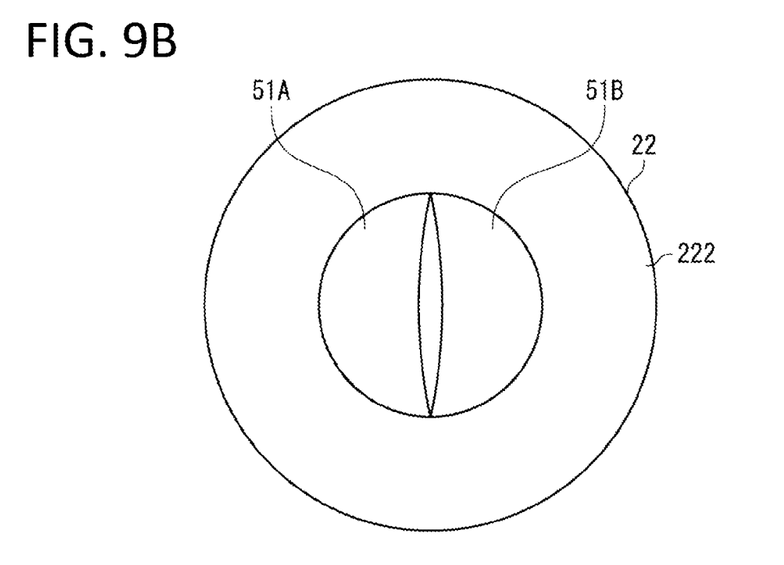

The partitions 51A and the partitions 51B are disposed alternately on one side and the other side in the diametrical direction of the inner peripheral surface of the support tube 22, and as shown in FIG. 9B, both partitions are formed in a substantially semicircular shape.

The shock waves of lightning are damped as they travel while being received by the partitions 51A and the partitions 51B inside the support tube 22.

Therefore, this embodiment can also prevent a pressure exceeding the set pressure from acting on the burst disc 21.

The configurations for protecting the burst disc 21 from lightning strikes described in the above embodiments can be combined appropriately.

For example, it is also possible to form the partitions 51A, 51B on the inner peripheral surface of the tube part 311 of the insulative member 31 of the first embodiment (FIG. 2).

Otherwise, the configurations presented in the above embodiments can be selectively adopted or appropriately modified into other configurations within the scope of the present invention.

The burst disc device of the present invention may be installed on the main body of the skin 11 instead of on the panel 11A.

Moreover, the burst disc device of the present invention can be installed at an arbitrary position of the main wing 10 other than the lower surface of the main wing 10.

The burst disc device of the present invention can be applied, not only to the main wings of an aircraft which are fuel storage devices, but also to fuel storage devices used for other transportation machines, such as ships and railways, plants, and the like.

What is claimed is:

1. A burst disc device of an aircraft comprising:
    a burst disc which is installed inside a main wing of an aircraft to prevent overpressurization of the main wing;
    a pressure release passage which is blocked with the burst disc and leads to the outside of the main wing;
    an insulative ring comprising a resin material, the insulative ring being disposed along an inner peripheral edge at a terminal end of the pressure release passage and exposed to the outside of the main wing;
    a support tube that supports the burst disc and partly constitutes the pressure release passage; and
    an insulation layer disposed between a flange of the support tube and an inner surface of a panel of the main wing.

2. The burst disc device of the aircraft according to claim 1, wherein the insulative ring covers a predetermined area of at least one of the surface of a member located around the terminal end and the inner periphery of the pressure release passage.

3. The burst disc device of the aircraft according to claim 1, wherein the pressure release passage has a cylindrical configuration, and wherein the insulative ring is protruding radially inwards with respect to the inner peripheral edge at the terminal end.

4. The burst disc device of the aircraft according to claim 1, wherein the insulative ring is provided with a conductive layer on its surface located on the outside of the main wing, wherein
    the conductive layer has conductivity and is grounded.

5. The burst disc device of the aircraft according to claim 1, wherein the pressure release passage is a labyrinth path having a plurality of partitions each extending in a horizontal direction perpendicular to a longitudinal axis of the pressure release passage.

6. The burst disc device of the aircraft according to claim 5, wherein the plurality of partitions includes a first partition and a second partition, the first and second partitions disposed on opposing sides of the pressure release passage in a non-overlapping manner, and wherein the first partition is disposed behind the second partition in a direction parallel to the longitudinal axis of the pressure release passage.

7. The burst disc device of the aircraft according to claim 1, wherein the insulative ring includes an annular shape member.

8. The burst disc device of the aircraft according to claim 1, wherein the insulative ring is disposed so as to be flush with a lower surface of the main wing.

9. The burst disc device of the aircraft according to claim 1, further comprising a mesh screen that covers the burst disc.

10. The burst disc device of the aircraft according to claim 1, wherein the inner peripheral edge at the terminal end of the pressure release passage corresponds to an inner peripheral edge of an opening of the panel removably provided on a lower skin of the main wing.

11. The burst disc device of the aircraft according to claim 10, wherein the insulative ring is disposed in a recess formed in the panel.

12. The burst disc device of the aircraft according to claim 10, wherein the insulative ring is disposed so as to be flush with a surface of the panel.

13. The burst disc device of the aircraft according to claim 1, wherein the insulative ring includes a tube part disposed on an inside of the support tube, and a flange integrally formed with the tube part at the lower end of the tube part and extending radially outwards with respect to the inner peripheral edge at the terminal end of the pressure release passage.

14. An insulative ring for protecting a burst disc, the burst disc installed inside a main wing of an aircraft to prevent overpressurization of the main wing, from lightning strikes, wherein the insulative ring comprises
    a resin material and is disposed along an inner peripheral edge at a terminal end of a pressure release passage which leads to the outside of the main wing, the pressure release passage provided with the burst disc configured to block the pressure release passage;
exposed to the outside of the main wing; and
has insulation properties, and
wherein the pressure release passage is partly constituted by a support tube that supports the burst disc, wherein an insulation layer is disposed between a flange of the support tube and an inner surface of a panel of the main wing.

* * * * *